US010902665B2

(12) United States Patent
Sun et al.

(10) Patent No.: US 10,902,665 B2
(45) Date of Patent: Jan. 26, 2021

(54) RENDERING IMAGES FROM DEEPLY LEARNED RAYTRACING PARAMETERS

(71) Applicant: ADOBE INC., San Jose, CA (US)

(72) Inventors: Xin Sun, Santa Clara, CA (US); Nathan Aaron Carr, San Jose, CA (US); Alexandr Kuznetsov, San Jose, CA (US)

(73) Assignee: ADOBE INC., San Jose, CA (US)

( * ) Notice: Subject to any disclaimer, the term of this patent is extended or adjusted under 35 U.S.C. 154(b) by 5 days.

(21) Appl. No.: 16/368,548

(22) Filed: Mar. 28, 2019

(65) Prior Publication Data

US 2020/0312009 A1 Oct. 1, 2020

(51) Int. Cl.
*G06T 15/06* (2011.01)
*G06T 15/00* (2011.01)
*G06N 7/00* (2006.01)
*G06N 20/00* (2019.01)
*G06N 3/08* (2006.01)

(52) U.S. Cl.
CPC ............... *G06T 15/06* (2013.01); *G06N 3/08* (2013.01); *G06N 7/005* (2013.01); *G06N 20/00* (2019.01); *G06T 15/005* (2013.01)

(58) Field of Classification Search
None
See application file for complete search history.

(56) References Cited

U.S. PATENT DOCUMENTS

| 7,499,053 | B2 * | 3/2009 | Keller | G06T 15/06 345/426 |
| 8,234,234 | B2 * | 7/2012 | Shearer | G06T 15/50 706/52 |
| 8,411,082 | B1 * | 4/2013 | Cook | G06T 15/06 345/419 |
| 2007/0182732 | A1 * | 8/2007 | Woop | G06T 15/50 345/420 |
| 2018/0260997 | A1 * | 9/2018 | Petkov | A61B 6/032 |

* cited by examiner

*Primary Examiner* — Said Broome
(74) *Attorney, Agent, or Firm* — Shook, Hardy & Bacon LLP

(57) ABSTRACT

Images are rendered from deeply learned raytracing parameters. Active learning, via a machine learning (ML) model (e.g., implemented by a deep neural network), is used to automatically determine, infer, and/or predict optimized, or at least somewhat optimized, values for parameters used in raytracing methods. Utilizing deep learning to determine optimized, or at least somewhat optimized, values for raytracing parameters is in contrast to conventional methods, which require users to rely of heuristics for parameter value setting. In various embodiments, one or more parameters regarding the termination and splitting of traced light paths in stochastic-based (e.g., Monte Carlo) raytracing are determined via active learning. In some embodiments, one or more parameters regarding the sampling rate of shadow rays are also determined.

20 Claims, 5 Drawing Sheets

RENDERING IMAGES FROM DEEPLY LEARNED RAYTRACING PARAMETERS

BACKGROUND

Raytracing is an image rendering method based upon tracing light paths through a three-dimensional (3D) scene. The rendered image is a two-dimensional (2D) projection of the 3D scene onto an image plane. The scene may be a virtual and/or augmented scene. Each light path may include a series of segments that connect a point on a light source and a discretized surface area of the image plane (i.e., a pixel). The 3D scene (or environment) includes one or more virtual objects and one or more light sources. A 2D image of the scene is rendered by generating light paths connecting the pixels of the image to be rendered and discretized surface areas of the light sources. Each pixel (except for "pure black" pixels) is illuminated by one or more of these light paths, which characterize the transmission and/or transport of photons, emitted by the light sources, through the environment. The color of each pixel in the rendered image is based on a combination of the light paths that intersect the pixel. More particularly, when rendering an image via raytracing, virtual light is emitted from the light sources and transmitted through the environment. The virtual reflections, refractions, and absorptions of the transmitted light from the surfaces and volumes of the virtual objects are simulated to generate a series or sequence of light path segments between the light sources and the pixels. The color for a particular image pixel is determined as a weighted average of the light paths intersecting the pixel.

Because the computational complexity of tracing every light ray that is emitted from the light source and transported to an image pixel is untractable, stochastic methods (e.g., Monte Carlo methods) are often employed. That is, light paths between the light sources and the image pixels are stochastically sampled. The sampling of the light paths may include stochastically generating light paths at the pixels of the image, and "reverse" tracing the light paths back into the environment and light source or stochastically generating light paths at the light sources, and "forward" tracing the light paths to the image pixels. That is, some conventional raytracing methods stochastically "gather" a sample of light paths for each pixel, starting from the pixel and "reverse" tracing, via reflections, refractions, and/or absorptions, the light path back into the 3D environment and to the light source. Other conventional methods stochastically "shoot" the light path from the light source and "forward" trace the light path to the image pixel. Bidirectional raytracing methods combine both the "gathering" and "shooting" raytracing methods. Bidirectional raytracing stochastically generates samples of light paths by "shooting" lights paths from the light source towards the image, as well as stochastically "gathering" lights paths starting at an image pixel and radiating back into the scene. The "heads" and "tails" of the "shooting" and "gathered" light paths are connected to generate the samples for each pixel.

Whether the implementation is forward, reverse, or bidirectional, Monte Carlo raytracing methods require the value setting of various parameters regarding the stochastic sampling of light paths. The performance of these stochastic-based implementations is highly dependent upon the selection of these raytracing parameters, which may vary depending upon the 3D environment, virtual objects, and/or lighting conditions of the scene. In conventional implementations, users are required to rely on heuristics to set the values for the various raytracing parameters. Because the heuristics are not usually adaptable to a wide range of 3D scenes and lighting conditions, the quality of image rendered in many conventional implementations of Monte Carlo raytracing suffers.

SUMMARY

The technology described herein is directed towards rendering images from deeply learned raytracing parameters. The various embodiments employ active learning, implemented via a machine learning (ML) model, to automatically determine, infer, and/or predict optimized, or at least somewhat optimized, values for parameters used raytracing methods. In various embodiments, one or more parameters regarding the termination and splitting of traced light paths in stochastic-based (e.g., Monte Carlo) raytracing are determined via active learning. In some embodiments, one or more parameters regarding the sampling rate of shadow rays are also determined.

In one non-limiting embodiment of a method for generating an image of a scene, the method includes receiving a selection of a scene. The scene may include a three-dimensional (3D) environment, one or more objects to be positioned within the 3D environment, one or more light sources to illuminate the 3D environment and/or the one or more objects, and an image plane, for which to render an image of the scene. At least a portion of the 3D environment, one or more objects, and/or one or more light sources may be virtual. In some embodiments, another portion of the 3D environment, one or more objects, and/or one or more light sources may be real.

In response to receiving the selection of the scene, a machine learning (ML) model (e.g., a deep neural network) may be employed to determine a value for at least one raytracing parameter based on the scene. The ML model may be trained via active learning. In some embodiments, the ML model is implemented via a fully-connected feed-forward neural network with at least three hidden layers. Each hidden layer may include at least 20 neurons. A set of light path samples may be generated based on the determined value for the at least one raytracing parameter and the scene. For example, Monte Carlo-based raytracing methods may be employed to generate the set of light path samples. An image of the scene may be rendered based on the generated set of light path samples.

A loss function may be determined and/or evaluated. The loss function may include a first factor that is based on a computational cost associated with generating the set of light path samples and a second factor that is based on a variance corresponding to direct and indirect lighting effects in the rendered image of the scene that are associated with the set of light path samples. A plurality of weights for the ML model (or neural network) may be updated based on the set of light path samples and the evaluated loss function. Updating the plurality of weights may be based on minimizing (or at least decreasing) a value of the loss function. The value for the at least one raytracing parameter may be updated based on the updated plurality of ML weights. Another set of light path samples may be generated based on the updated plurality of weights. The image may be updated and/or re-rendered based on the updated value for the at least one raytracing parameter and/or the additional set of light path samples. The iterative training of the ML model and rendering of the image may be alternated until one or more convergence tests are satisfied. The convergence tests may test a convergence condition on one or more of the loss function, the rendered image, and/or the values of the raytracing parameters.

In various embodiments, the one or more raytracing parameters, determined via deep active learning, indicate a termination and/or splitting of the light paths in the set of light paths that are sampled via stochastic-based raytracing are determined via active learning. In some embodiments, at least some of the one or more parameters indicate a sampling rate of shadow rays.

DETAILED DESCRIPTION

Figure 1:
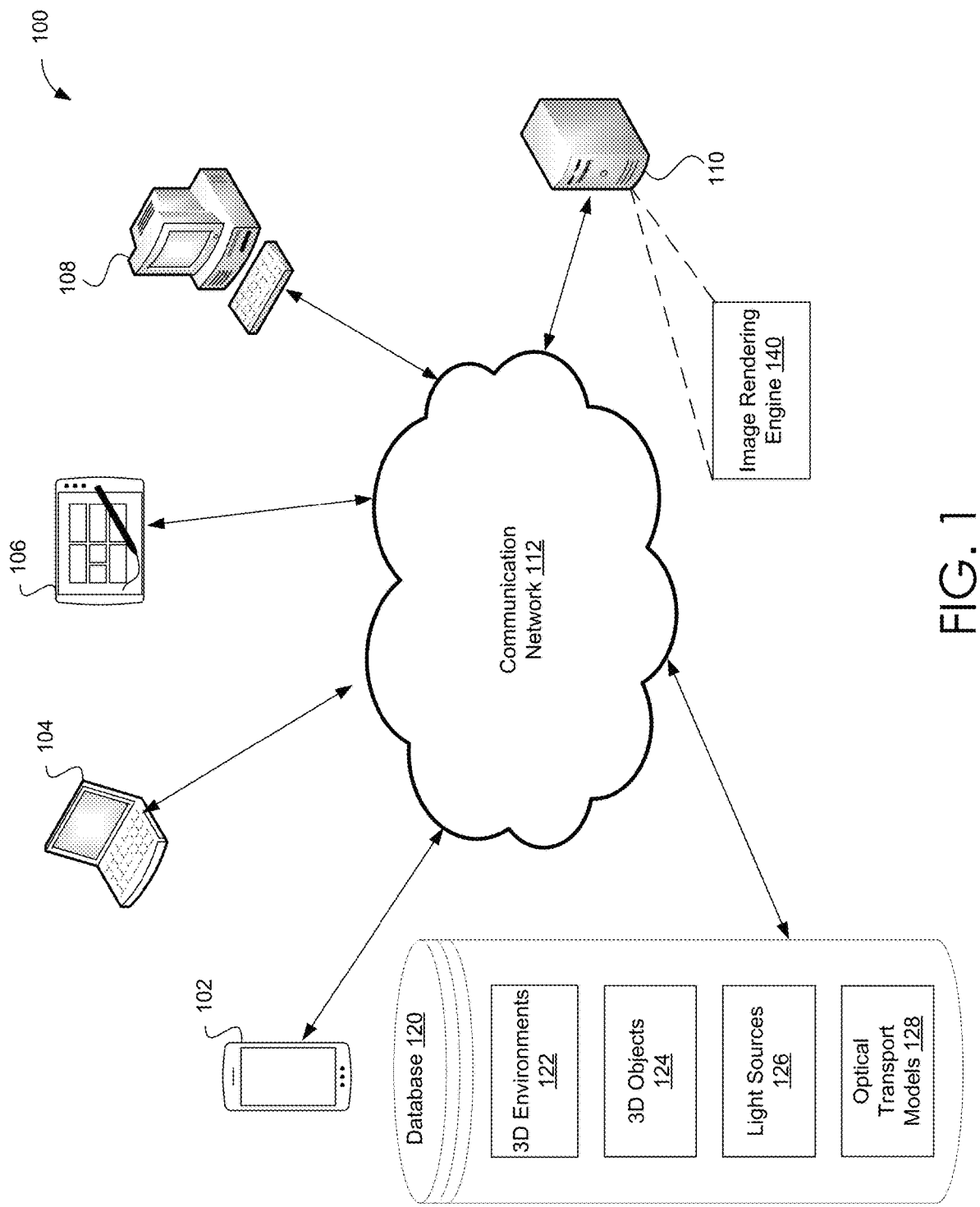
FIG. 1 illustrates an enhanced image rendering system implementing various embodiments presented herein.

The various embodiments of the technology described herein are directed towards rendering images from deeply learned raytracing parameters. The various embodiments employ active learning, implemented via a deep neural network, to automatically determine, infer, and/or predict optimized, or at least somewhat optimized, values for parameters used in raytracing methods. Utilizing deep learning to determine optimized, or at least somewhat optimized, values for raytracing parameters is in contrast to conventional methods, which require users to rely of heuristics for parameter value setting. In various embodiments, one or more parameters regarding the termination and splitting of traced light paths in stochastic-based (e.g., Monte Carlo) raytracing are determined via active learning. In some embodiments, one or more parameters regarding the sampling rate of shadow rays are also determined.

Although the various embodiments discussed herein are directed towards Monte Carlo (MC)-based implementations that trace the light paths from the pixels to the light sources (e.g., path tracing methods), other embodiments are not so limited. It should be understood that the embodiments may employ active learning to determine values for raytracing parameters for other implementations of MC-based raytracing, such as but not limited to bidirectional raytracing, photon mapping, and vertex connection and merging methods. Furthermore, although the various embodiments discussed herein are directed towards the prediction of optimized, or at least somewhat optimized, values for parameters regarding the termination and splitting of light paths in raytracing, it should be understood that the embodiments are not so limited. The various enhanced methods discussed herein may be employed to (somewhat) optimize the values for other raytracing parameters. As used herein, the terms "ray" and 'path" may be used interchangeably with regards to the transmission and/or transport of photons and/or electromagnetic (EM) waves. Thus, the terms "raytracing" and "path tracing" may be used interchangeably.

A neural network (NN) may be iteratively trained during the rendering of an image to determine optimized, or at least somewhat optimized, values for the parameters based on a three-dimensional (3D) environment, one or more objects placed within the environment, the lighting conditions for the environment, and an image plane positioned within the environment. For example, the image plane may be the focal plane of a real or virtual camera capturing an image (i.e., a 2D projection) of the 3D environment.

The 3D environment may be a virtual environment that includes one or more virtual and/or real objects. For example, the environment may be a virtual environment, where a real-life actor and/or a virtual object are to be positioned within the environment. The various embodiments may be employed to render an image of the real-life actor interacting with the virtual object within the virtual environment. In some embodiments, the environment may be a real environment that is augmented with one or more (real and/or virtual) objects (e.g., a digital character or structure placed within a real-life scene of a movie). In at least one embodiment, a real object may be placed within a real environment, where the real object was never physically within the environment. For example, an image of a real-life actor located at the top of a real-life mountain, may be rendered without requiring the actor to physically travel to the top of the mountain. In the various embodiments, the light sources may be real light sources, virtual light sources, or a combination thereof. For example, an augmented environment (including a digital character) may be illuminated with a real light source, whereas a virtual environment may be illuminated with virtual light sources. The NN may be trained via actively learning to determine the one or more parameters for sampling the real and/or virtual light paths. In active learning, the training of the NN and the rendering of an image of the virtual and/or augmented scene are alternated and iterated over until the image, rendered via the NN determined parameters, converges based on one or more convergence tests. As used herein, the terms "real," "real-world," and "real-life" may be used interchangeably to refer to environments, scenes, objects, photon sources, and/or images that exists in the real world. In contrast, the term "virtual" may refer to environments, scenes, objects, photon sources, and/or images that are at least partially simulated and/or generated via one or more computing devices.

An untrained and/or initialized neural network may determine initial values for the one or more raytracing parameters. A plurality of light path samples (e.g., a set of sampled light paths) may be stochastically generated and traced through the environment, based on the determined raytracing parameters. An initial image of the scene may be generated and/or rendered based on the sampled light paths generated via the initial determination of the parameters. A loss function may be computed based on the rendering of the image. The loss function may account for both a computational cost of the raytracing and variances generated by splitting the light path samples. Thus, the loss function may account for and balance both the computational resources (time, processing power, and memory) required to render the image and the realism and/or accuracy of the rendered image for the determined parameters. The weights on the NN are updated (i.e., the NN is trained) to decrease the value of the loss function. The raytracing parameter values are re-determined and/or updated based on the updated weights of the NN. Another set of light path samples are stochastically generated, based on the updated raytracing parameters, to re-render the image. An updated loss function is computed. The NN is again updated (or trained) based on the current rendered image and/or set of light path samples. The training and the rendering of the image are alternated and iterated over until a convergence of the determined parameters and/or the rendered image satisfies one or more convergence conditions. The final rendered image may be provided to a user.

As noted above, in conventional raytracing methods, the user may rely on heuristics to select the values for the various parameters. The realism of the rendered image, as well as the computational cost to render the image, are highly dependent upon the selection of the parameters. The user-relied upon heuristics may fail to provide adequate parameter selections for various 3D environments, virtual objects, and lighting conditions. Thus, conventional raytracing methods, which rely upon manual-tuning of parameters may suffer from unrealistic image renderings and/or inefficient use of computational resources (time, processing power, and memory). The various embodiments herein overcome these, and other shortcomings associated with conventional methods of raytracing. The various embodiments employ active learning implemented via a NN to automatically determine optimized, or at least somewhat optimized, determinations and/or predictions for the one or more raytracing parameters. Thus, the various embodiments generate more realistic images than conventional methods. Furthermore, the various embodiments more efficiently employ computational resources than conventional methods. For example, the iterative and alternating tasks of inferring and/or predicting raytracing parameter values via the NN, stochastically generating light path samples based on the predicted parameter values, and updating the "learned" weights of the NN to predict optimized parameter values may be split and parallelized (e.g., multithreaded) on separate computational units, such as but not limited to separate graphical processing unit (GPU) cores of one or more GPUs. Accordingly, the various embodiments provide a clear and significant enhancements to the performance of computer-related technologies, such has but not limited to image rendering technologies that employ stochastic-based raytracing.

Example Operating Environment

FIG. 1 illustrates an enhanced image rendering system 100 implementing various embodiments presented herein. Rendering system 100 includes one or more various computing devices, such as but not limited to mobile computing device 102, laptop computing device 104, tablet computing device 106, desktop computing device 108, and server computing device 110. Various embodiments of a computing device, such as but not limited to computing devices 102-110 are discussed in the context of computing device 500 of FIG. 5. Computing devices 102-110 may be communicatively coupled via communication network 112. Any of computing devices 102-110 may host, implement, and/or operate an enhanced image rendering engine 140. In the non-limiting embodiment, illustrated in FIG. 1, server computing device 110 is hosting enhanced image rendering engine 140. In some embodiments, image rendering engine 1140 may operate as a server application. In such an embodiment, any of computing devices 102-108 may host, implement and/or operate a client application that corresponds to the image rendering engine server application, e.g., system 100 may implement a client/server architecture.

System 100 may additionally include a database 120. Database 120 may be communicatively coupled to any of computing devices 102-110, as well as image rendering engine 140, via communication network 112. Database 120 may include one or more sub-databases and/or additional databases. In some embodiments, database 120 includes a database of three-dimensional (3D) environments 122, a database of 3D objects 124 that may be positioned within the 3D environments of environments database 122, and a database of light sources 126 that may illuminate the virtual objects positioned within a virtual environment. The 3D environments included in 3D environments database 122 may include real and/or virtual environments. The objects included within 3D objects database 124 may be real and/or virtual objects. Similarly, the photon sources included in photon sources database 126 may be real, and/or virtual light sources. Database 120 may also include a database of optical transport or transmission models 128. An optical transport model included in model database 128 may enable the modeling and/or simulation of the reflections, absorptions, and refractions of the virtual light as it is transmitted through the virtual environment to illuminate the virtual objects within the environment.

Communication network 112 may be a general or specific communication network and may communicatively couple at least a portion of computing devices 102-110, enhanced recommendation engine 140, and any database included in database 120. Communication network 112 may be any communication network, including virtually any wired and/or wireless communication technologies, wired and/or wireless communication protocols, and the like. Communication network 112 may be virtually any communication network that communicatively couples a plurality of computing devices and storage devices in such a way as to computing devices to exchange information via communication network 112.

Figure 2:
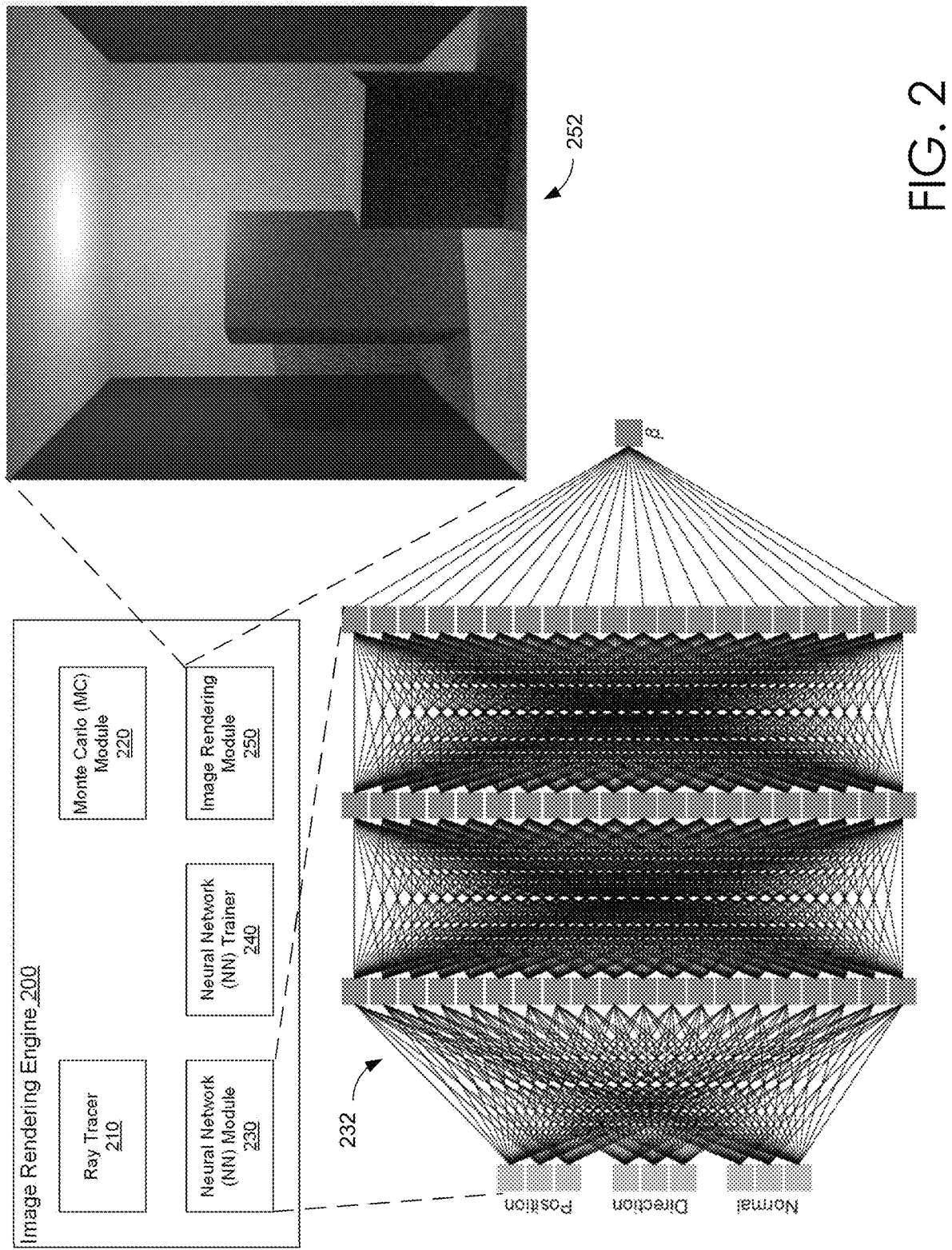
FIG. 2 illustrates an enhanced image rendering engine that determines raytracing parameters, via deep learning, and renders images based on the determined parameters, in accordance with the various embodiments.

Various embodiments of enhanced image rendering engine 140 are discussed in conjunction with at least FIG. 2. However, briefly here, image rendering engine 140 may be configured and arranged to render images based on the automated prediction of deeply learned raytracing parameters. Image rendering engine 140 employs active learning, implemented via a deep neural network, to automatically determine, infer, and/or predict optimized, or at least somewhat optimized, values for parameters used in Monte Carlo-based raytracing methods. Image rendering engine 140 employs the deeply learned raytracing parameters to perform Monte Carlo-based raytracing to render images of the illuminated real, virtual, and/or mixed scenes.

In various embodiments, image rendering engine 140 employs active learning to determine, predict, and/or infer one or more raytracing parameters regarding the termination and splitting of sampled light paths in MC-based raytracing methods. In some embodiments, one or more parameters regarding the sampling rate of shadow rays are also determined. Although the various embodiments discussed herein are directed towards MC-based implementations that trace the light paths from the pixels to the light sources (e.g., path tracing methods), other embodiments are not so limited. It should be understood that image rendering engine 140 may employ active learning to determine values for raytracing parameters for other implementations of MC-based raytracing, such as but not limited to bidirectional raytracing, photon mapping, and vertex connection and merging methods. Furthermore, although the various embodiments discussed herein are directed towards image rendering engine 140 predicting optimized, or at least somewhat optimized, values for raytracing parameters regarding the termination and splitting of light paths in raytracing, it should be understood that the embodiments are not so limited. Image rendering engine 140 may be employed to optimize the values for other raytracing parameters.

Enhanced image rendering engine 140 may iteratively train (i.e., update the weights of) a neural network (NN) during the rendering of an image to determine optimized, or at least somewhat optimized, values for the parameters based on a virtual and/or augmented three-dimensional (3D) environment, one or more virtual objects placed within the environment, the lighting conditions for the environment, and an image plane positioned within the environment. The NN may be a fully-connected feed-forward deep network with at least two hidden layers. Image rendering engine 140 may iteratively train the NN, via actively learning, to determine the one or more parameters for stochastically sampling the light paths. During active learning, the training of the NN and the rendering of an image of the virtual scene are alternated and iterated over until the image, rendered via the NN-based inference of the values of the parameters, and/or the inferred values of the parameters converge based on one or more convergence tests Employing Deep Learning to Determine Raytracing Parameters FIG. 2 illustrates an enhanced image rendering engine 200 that determines raytracing parameters, via deep learning, and renders images based on the determined parameters, in accordance with the various embodiments. Image rendering engine 200 may be similar to image rendering engine 140 of FIG. 1. To determine, infer, and/or predict raytracing parameters and render images based on the parameters, image rendering engine 200 may include a ray tracer 210, a Monte Carlo (MC) module 220, a neural network (NN) module 230, an NN trainer 240, and an image rendering module 250.

In the various embodiments, one or more virtual and/or real objects, included in 3D objects database 124 of FIG. 1, may be positioned within a 3D environment. The 3D environment may be a virtual environment included in 3D environments database 122 of FIG. 1. In other embodiments, the 3D environment may be a real environment. Likewise, the objects positioned within the environment may be real and/or virtual objects. For example, a real-world or virtual character may be placed or positioned within a real-world or virtual environment. One or more real and/or virtual light sources may illuminate the real and/or virtual objects within the real and/or virtual environment. The one or more light sources may be virtual light sources included in light sources database 126. At least one of the light sources may be a real-world light source, while one or more other lights sources may be a virtual light source. For instance, a real-world light source may illuminate the virtual character included and/or positioned within the environment or a virtual light source may illuminate a real-world actor placed within a virtual environment. When a real-world environment is populated with one or more virtual objects and/or one or more virtual light sources, the environment may be an "augmented" environment and/or an "augmented-reality" environment. Similarly, when a virtual environment is populated with one or more virtual objects and/or one or more virtual light sources, the environment may be a "virtual" environment and/or a "virtual-reality" environment. When a virtual and/or real environment is populated with a combination of real-world and virtual objects, the environment may be a "mixed," or "mixed reality" environment.

As used herein, terms such as "virtual scene," "augmented scene," "mixed scene," and "scene" may be used to refer to the combination of the 3D virtual/augmented environment, one or more objects positioned within the environment, and the lighting conditions of the environment. The light conditions of the environment may include the position, color (e.g., an electromagnetic frequency or wavelength distribution), and intensity (e.g., an illuminance) of the one or more light sources illuminating the environment and the objects positioned within the environment. The surfaces of the objects may characterized by one or more reflectance and/or absorption coefficients, which may be wavelength (or frequency) dependent. The volumes of the environment, as well as the volumes of the objects may be characterized by transmission, absorption, and/or refraction coefficients (e.g., an index of refraction), which may be wavelength (or frequency) dependent. Such coefficients may be included in one or more optical transport and/or transmission models included in optical transport models database 128 of FIG. 1. A two-dimensional (2D) image plane may be defined and/or positioned within the environment, such that light, originating from the light sources and illuminating the image plane, generates a 2D image of the 3D scene projected onto the image plane. The image plane may be the focal plane of a real or virtual camera capturing a 2D projection (i.e., an image) of the 3D environment. The light that was reflected by the various objects and that illuminates the image plane results in the imaging of the objects on the image plane.

As discussed elsewhere, enhanced image rendering engine 200 is generally responsible for rendering images (e.g., image 152) from deeply learned raytracing parameters. Image rendering engine 200 employs active learning, implemented via a deep neural network (e.g., neural network 132), to automatically determine, infer, and/or predict optimized, or at least somewhat optimized, values for parameters used in Monte Carlo (MC) raytracing methods. Image rendering engine 200 determines one or more parameters regarding the termination and splitting of traced light paths in MC-based raytracing, via active learning. In some embodiments, one or more parameters regarding the sampling rate of shadow rays are also determined. Although the various embodiments discussed herein include image rendering engine 220 determining, predicting, and/or inferring optimized, or at least somewhat optimized, values for parameters regarding the termination and splitting of light paths in raytracing, it should be understood that the embodiments are not so limited. Image rendering engine 200 may be employed to optimize the values for other raytracing parameters, e.g., bidirectional raytracing parameters.

A neural network (NN), such as but not limited to NN 132, is iteratively trained during the rendering of an image to determine optimized, or at least somewhat optimized, values for the parameters based on the 3D scene and the 2D image plane positioned within the scene. The NN may be trained via actively learning to determine the one or more parameters for sampling the light paths. In active learning, the training of the NN and the rendering of an image of the virtual scene are alternated and iterated over until the image, rendered via the NN determined parameters, converges based on one or more convergence tests.

Ray tracer 210 is generally responsible tracing light paths (or light rays) through the virtual 3D scene based on one or more raytracing parameters. In various embodiments, ray tracer 210 generates a set of light path samples, based on MC methods and the raytracing parameters, through the scene. Ray tracer 210 may employ one or more optical transport and/or transmission models, included in optical transport models database 128, to transport virtual and/or real-world photons, emitted from the light sources, through the virtual scene and model reflectance, absorptions, and refractions from the virtual surfaces of the objects within the scene.

Some of the light path samples may include a plurality of segments that connect a pixel of the image plane to a discretized area of a virtual light source. MC module 220 is generally responsible for generating the stochastic selections for performing the MC methods. For example, MC module 220 may include one or more random number generators, or pseudo-random number generators, to generate the random numbers required for MC-based raytracing. MC module may select random or pseudo-random numbers based on one or more probability distributions. At least some of the determined raytracing parameters may at least partially characterize the one or more probability distributions.

NN module 230 is generally responsible for implementing a NN, such as but not limited to NN 232, to determine, infer, and/or predict the one or more raytracing parameters. NN 232 may implement a machine learning (ML) model. NN trainer 240 is generally responsible for employing active learning to train NN 232. Thus, NN trainer 240 may train one or more ML models. That is NN trainer 240 may employ methods to update the weights of the NN. Such methods may include, but are not limited, methods of gradient descent employed to minimize, or at least decrease, a loss function. Thus, in some embodiments, NN trainer 240 may be employed to calculate a loss function. Image rendering module 250 is generally responsible for rendering and/or generating an image, such as but not limited to image 252, based on the set of sampled light paths.

For example, NN module 230 may employ an untrained and/or initialized NN 232 to determine initial values for the one or more raytracing parameters. Ray tracer 210 may employ MC module 230 and an optical transmission model to generate and/or trace a plurality of light path samples through the scene, based on the raytracing parameters determined via NN module 230. That is, ray tracer 210 may stochastically generate a set of light path samples. Image rendering module 250 may generate and/or render an initial image of the scene based on the sampled light paths generated by ray tracer 210. NN trainer 240 may calculate or compute a loss function based on the set of sampled light paths and/or the rendered image. The loss function may account for both a computational cost of the raytracing and variances generated by splitting the bidirectional light path samples. Thus, the loss function may account for and balance both the computational resources (time, processing power, and memory) required to render the image and the realism and/or accuracy of the rendered image for the determined parameters. NN trainer 240 may update the weights of NN 132 to decrease the value of the cost function. NN module 230 may employ the updated NN 232 to re-determine and/or update the values of the raytracing parameters. Ray tracer 210 may generate another set of light path samples based on the updated raytracing parameters, updated loss function is computed. The NN is again updated (or trained) based on the current rendered image. NN trainer 240 may re-calculate the loss function and update the NN based on the set of generated light samples and/or the re-rendered image. The training and the rendering of the image are alternated and iterated over until a convergence of the determined raytracing parameters and/or the rendered image satisfies one or more convergence conditions. A final rendered image, such as but not limited to image 252, may be provided to a user.

More particularly, for MC-based raytracing methods, the color of a particular pixel in an image may be estimated by sampling contributions from a sample of light paths illuminating the pixel, via the following expression, $$\hat{I} = \frac{1}{n}\sum_{i=1}^{n} I(x_i),$$

where $\hat{I}$ is the estimate for the particular pixel's color, $x_i$ represents a set of sampled light paths that illuminate the particular pixel, n is the number of sampled light paths that illuminate the particular pixel, and $l(x_i)$ represents the contribution to the final color of each sampled light path. Each light path is sampled stochastically, such that the i-th sampled light path's ($x_i$) contribution to the particular pixel's color's ($l(x_i)$) is determined based on a throughput function ($f(x_i)$) along a differential measurement and a corresponding probability function ($p(x_i)$), via the following ratio:

$$I(x_i) = \frac{f(x_i)}{p(x_i)}.$$

In the following discussion, a single light path, of the set of n light paths, is discussed. Thus, in the interest of clarity, in the following discussion, the index (i) for the light path is omitted. A light path x is composed of l segments (characterized by l+1 3D vertices, indicated as $x_j$), connecting the pixel of the image plane ($x_0$) to a discretized surface area of a light source ($x_l$), where l is a positive integer. Thus, light path x may be composed of l+1 vertices, $x=\{x_0, x_1, x_2, \ldots, x_l\}$. The vertex located on the light source (i.e., $x_l$) may be stochastically sampled directly from the light source. Alternatively, $x_l$ may be sampled by intersecting the light source, via tracing the light path from $x_{l-1}$ and striking position $x_l$ on the light source. As used herein, a subscript d refers to the scenario where $x_l$ is sampled directly from the light source, and a subscript t refers to sampling $x_l$ from the next ray segment $x_{l-1}$.

The sampling probability ($p_d(x)$) for sampling $x_l$ of light path x directly from the light source includes the product of the probabilities of sampling each of the included vertices, $$p_d(x) = p(x_0)\prod_{i=1}^{l-1} \vec{p}(x_i)p(x_l),$$

where each of the vertices $\{x_1, x_2, \ldots, x_{l-1}\}$ are sampled by tracing from the preceding vertices (i.e., ray tracer 210 may sample $x_2$ by transmitting or transporting the path from $x_1$ to $x_2$), and the corresponding probability is indicated as $\vec{p}(x_i)$. The vertices $x_0$ and $x_l$ are directly sampled from the image pixels and the light source, respectively, via the probabilities $p(x_0)$ and $p(x_0)$, respectively.

Similarly, the sampling probability ($p_t(x)$) for sampling $x_l$ of light path x from next ray segment $x_{l-1}$ may be written as follows:

$$p_t(x) = p(x_0)\prod_{i=1}^{l-1} \vec{p}(x_i)\vec{p}(x_l).$$

For each vertex $x_i$, $i \in 1,2,l-1$, there are two corresponding non-negative raytracing parameters $q_d(x_i)$ and $q_t(x_i)$. Raytracing parameter $q_d(x_i)$ indicates the number of direct samples on light source that intersect $x_i$. Raytracing parameter $q_t(x_i)$ indicates the number of samples of tracing next ray segments on light source that intersect $x_i$. If $q_t(x_i)=0$, then ray tracing may be terminated at $x_i$. If $q_t(x_i) \in (0,1]$, then a Russian roulette method may be employed to stochastically terminate light path x at $x_i$ or trace one more segment from $x_i$. In various embodiments, MC module 220 may be employed to select a random or pseudo-random number for employing Russian roulette methods. If $q_t(x_i) > 1$, path splitting is employed in tracing following ray segments from $x_i$. For the specific light path x, multiple importance sampling (MIS) is employed, as various vertices of the path x may be sampled via a direct light source sampling, next vertex sampling, or a combination thereof. With the light path termination, Russian roulette, and/or light path splitting, MIS may take both $a_d(x_i)$ and $q_t(x_i)$ into account via MIS weights: $w_d(x)$ and $w_t(x)$. The MIS weights $w_d(x)$ and $w_t(x)$ correspond to $p_d(x)$ and $p_t(x)$ respectively, where the expressions for $p_d(x)$ and $p_t(x)$ are provided above. The expressions for $w_d(x)$ and $w_t(x)$ are provided below and are dependent upon $q_d(x_i)$ and $q_t(x_i)$ respectively:

$$w_d(x) = \frac{p_d(x)}{p_d(x)q_d(x_{l-1})\prod_{i=0}^{l-2}q_t(x_i) + p_t(x)\prod_{i=0}^{l-1}q_t(x_i)} =$$

$$\frac{p(x_l)}{(p(x_l)q_d(x_{l-1}) + \vec{p}_l q_t(x_{l-1}))\prod_{i=0}^{l-2}q_t(x_i)}$$

$$w_t(x) = \frac{p_t(x)}{p_d(x)q_d(x_{l-1})\prod_{i=0}^{l-2}q_t(x_i) + p_t(x)\prod_{i=0}^{l-1}q_t(x_i)} =$$

$$\frac{\vec{p}(x_l)}{(p(x_l)q_d(x_{l-1}) + \vec{p}_l q_t(x_{l-1}))\prod_{i=0}^{l-2}q_t(x_i)}.$$

The various embodiments employ active learning to determine at least one of the raytracing parameters $q_d(x_i)$ and/or $q_t(x_i)$. Based on the determination of $q_d(x_i)$ and/or $q_t(x_i)$, via active learning, the MIS weights $w_d(x)$ and $w_t(x)$ are determined via the above expressions. In an embodiment discussed below, $q_d(x_i)$ is assumed to be held constant with a value of 1.0 and active learning is employed to determine $q_t(x_i)$. However, other embodiments are not so limited, and it is understood that active learning may be employed to determine $q_d(x_i)$ in a similar fashion. The notation $x_{0 \to 1}$ is introduced to denote the sub-path $x_{0 \to i} = \{x_0, x_1, x_2, \ldots, x_i\}$ from image pixel $x_0$ to vertex $x_i$. The throughput of sub-path $x_{0 \to i}$ is denoted as $f(x_{0 \to i})$. The contribution to the final color of pixel $x_0$ ($l(x)$) of the complete path x may be represented by the contribution $l(x_{0 \to i})$ of the sub-path $x_{0 \to i}$ as:

$$l(x) = l(x_{0 \to i})L(x_i \to x_{i-1}), \text{ where}$$

$$l(x_{0 \to i}) = \frac{f(x_{0 \to i})}{p(x_{0 \to i})}, \text{ and}$$

$$p(x_{0 \to i}) = p(x_0)\prod_{j=1}^{i}\vec{p}(x_j).$$

$L(x_i \to x_{i-1})$ is the radiance of the light path x from $x_i$ to $x_{i-1}$, and $f(x_{0 \to i})$ and $p(x_{0 \to i})$ are the throughput and probability of sub-path $x_{0 \to i}$ respectively. Raytracing parameter $\beta$, which is a function of vertex $x_i$ and direction $x_i \to x_{i-1}$ is introduced and defined as:

$$q_t(x_i) = \beta(x_i, x_i \to x_{i-1})/(x_{0 \to i}), \text{ such that}$$

$q_t(x_i)$ is linearly proportional to the contribution of the sub-path $x_{0 \to i}$. In the various embodiments, $\beta(x_i, x_i \to x_{i-1})$ is determined via active learning, as described below. Raytracing parameter $q_t(x_i)$ is determined, based on $\beta$, via the above definition of $\beta$. It should be understood that another raytracing parameter may be determined for $q_d(x_i)$, such that $q_d(x_i)$ may also be determined via active learning.

More specifically, image rendering engine 200 may implement NN 232 to determine $\beta(x_i, x_i \to x_{i-1})$. As shown in FIG. 2, NN 232 may be a fully-connected feed forward NN. In the various embodiments, prior to rendering an image, NN trainer 240 may initialize the weights of NN 232. In some embodiments, the initialization of the weights of NN 232 may be random. For example MC module 220 may generate a random value for each weight of NN 232. NN module 230 may employ the initialized NN 232 to determine $\beta(x_i, x_i \to x_{i-1})$ and $q_t(x_i)$. In some embodiments, NN module 230 may similarly determine $q_d(x_i)$, which may be determined via a separate NN not shown in FIG. 2. For each rendering/training iteration, ray tracer 210 may generate sampled light paths based on $q_t(x_i)$ (and $q_d(x_i)$). Image rendering module 250 may generate a rendering of image 252 based on the sampled light paths. NN trainer 240 may employ the sampled light paths and/or the rendered image to update the weights of NN 232. The rendering and training may be alternated and iterated over to generate a final rendering of image 252.

As shown in FIG. 2, NN 232 may be a fully-connected NN, with at least three hidden layers. Each hidden layer may include at least 20 nodes. Each node of each hidden layer may employ an activation function, such as but not limited to a rectified linear unit (ReLU). However, NN 232 is not intended to be limiting, and other NN architectures may be employed. The input lay may receive a nine dimension input vector (or three 3D input vectors) encoding a 3D position ($x_i$), a 3D direction ($x_i \to x_{i-1}$), and a 3D surface normal at $x_i$. The output layer provides the scalar $\beta(x_i, x_i \to x_{i-1})$. In at least one embodiment, so as to provide a continuous valued output, the output layer may not employ an activation function. In various embodiments, the batch size of sampled light paths for each iteration may be 10,000 light paths.

NN trainer 240 may update the weights of NN 232 by minimizing a loss function ($\mathcal{L}$) based on the sampled light paths of the previous iteration. The loss function may include two factors: a first factor ($\mathcal{C}(x_{0 \to i})$) accounting for the computational cost for sampling each of the sub-paths and a second factor ($v(x_{0 \to i})$) that accounts for the weighted sum of variances of the sub-paths. Given sub-path there is a set of complete light paths that includes the sub-path, $\{x_k | x_{k,j} = x_j, j \leq i\}$. $x_k$ is the k-th complete light path and $x_{k,j}$ is the j-th vertex of $x_{0 \to i}$. Using this notation, the loss function may be written as:

$$\mathcal{L} = (\Sigma_j \, \mathcal{C}(x_{0 \to i})(\Sigma_k v(x_{0 \to i})).$$

The cost factor ($\mathcal{C}$) of the loss function is dependent on the total number of splitted ray segments that were sampled after vertices and the direct light sampling rays at $x_i$, $$C(x_{0 \to i}) = 1 + |\{x_{k,j} \mid j > 1\}| \frac{\beta(x_i, x_i \to x_{i-1})}{\beta_{old}(x_i, x_i \to x_{i-1})},$$

where $x_{k,j}$ may be generated by tracing, and 1 is the direct light sample at $x_i$ as $q_d$ is held at the constant value of 1.0. $\beta_{old}$ is the value used in rendering image 252 during the previous rendering/training iteration, and β (in the above numerator) is the updated value in the current rendering/training iteration.

The variance factor (v) of the loss function is dependent on the squared values of direct and indirect lighting at $x_i$, $$\mathcal{V}(x_{0 \to i}) = L^2(x_{l_i} \to x_i \to x_{i-1}) + \frac{\beta_{old}(x_i, x_i \to x_{i-1})}{\beta(x_i, x_i \to x_{i-1})} \sum_k L^2(x_{l_i} \to x_i \to x_{i-1}),$$

where $L(x_{l_j} \to x_i \to x_{i-1})$ is the contribution of direct light sample from $x_j$ to $x_{i-1}$ evaluated at the vertex $x_i$. $L^2(x_{l_j} \to x_i \to x_{i-1})$ is the contribution of indirect lighting along all $x_k$ to $x_i$ through vertex $x_i$.

Rendering Images from Deeply Learned Raytracing Parameters Via Multithreading

Figure 3:
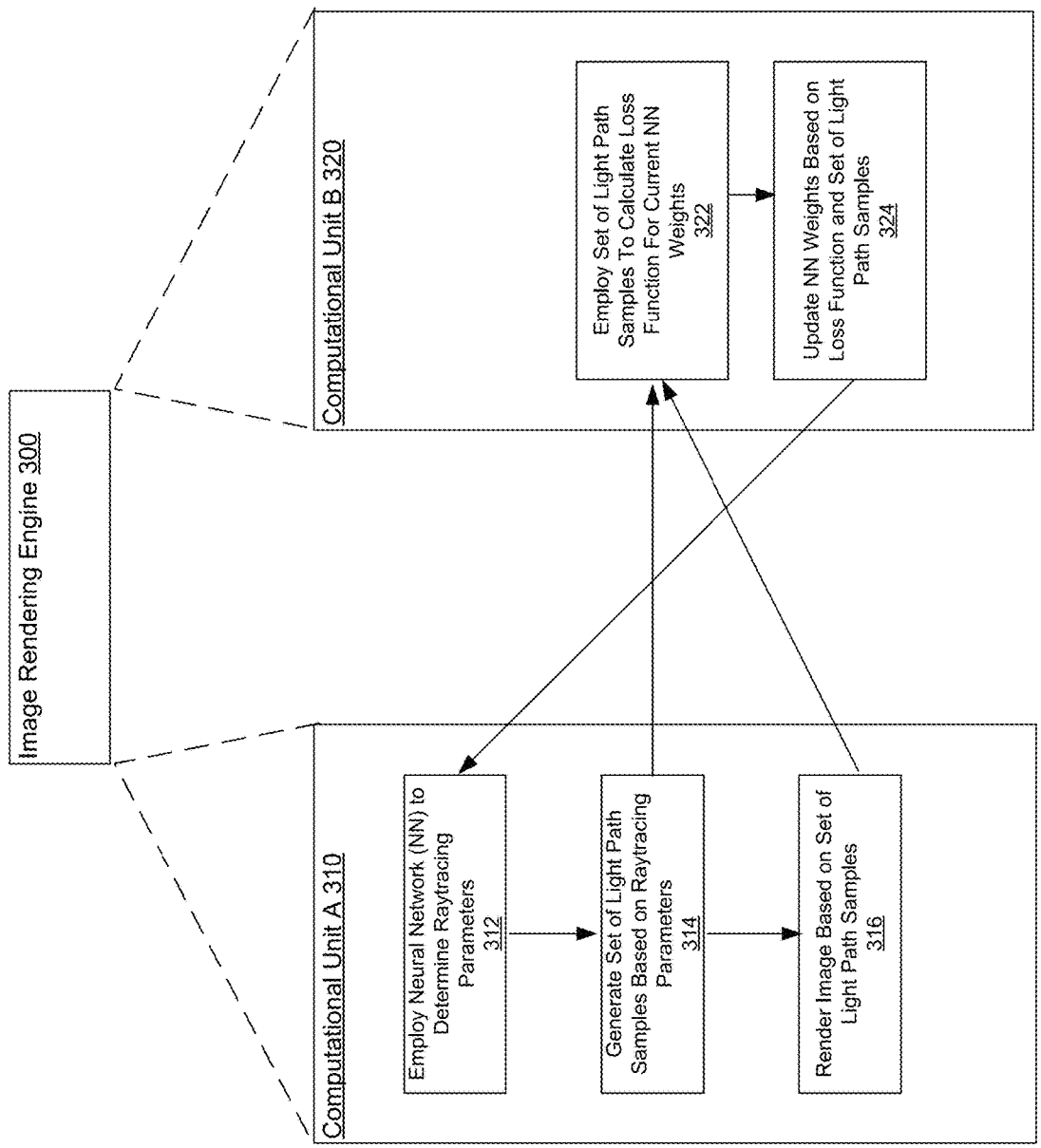
FIG. 3 illustrates an exemplary embodiment of employing multithreading to render images from deeply learned raytracing parameters via multithreading.

FIG. 3 illustrates an exemplary embodiment of employing multithreading to render images from deeply learned raytracing parameters via multithreading. In FIG. 3, an image rendering engine 300 is employing two separate computational units, computational unit A 310 and computational unit B 320, to render an image, via the various enhanced embodiments discussed herein. Image rendering engine 300 may be similar to image rendering engine 140 of FIG. 1 and/or image rendering engine 200 of FIG. 2. Computational unit A 310 and/or computational unit B 320 may include at least one or more of a central processing unit (CPU), graphical processing unit (GPU), microcontroller, microprocessor, application-specific integrated circuit (ASIC), field-programmable gate array (FPGA), or some other logic device. In at least one embodiment, computational unit A 310 and computational unit B 320 may be separate CPU and/or separate GPU cores. The architecture shown in FIG. 3 is not intended to be limiting, and other embodiments may employ other architectures for multithreading and/or parallelizing the rendering of images from deeply learned raytracing parameters.

As shown in FIG. 3, image rendering engine 300 employs separate computational units (computational unit A 310 and computational unit B 320) to parallelize and multithread the iterative and alternating tasks of determining raytracing parameter values, via the deep learning, and stochastically generating light path samples based on the predicted parameter values, and updating the "learned" weights of the NN to predict optimized parameter values. Such penalization and multithreading of these tasks may enable the more efficient employment of computational resources, to significantly improve the efficiency of rendering images via deeply learned raytracing parameters. In the embodiment shown in FIG. 3, or any other parallelization and/or multithreading embodiment, the any combination of the various logical blocks may be implemented and/or executed in various sequences, including serial and/or parallel sequences.

In block 312, the computational resources of computational unit A 310 may be utilized to employ a neural network (NN), such as but not limited to NN 232 of FIG. 2, to determine one or more raytracing parameters. The determined raytracing parameters may include, but are not limited to at least one $q_r(x_i)$ or $q_d(x_i)$. At block 314, the computational resources of computational unit A 310 may be utilized to generate a set of light path samples based on the determined raytracing parameters. At block 316, the computational resources of computational unit A 310 may be utilized to render an image based on the set of light path samples. As shown in FIG. 3, the set of light path samples and/or the rendered image may be provided to computational unit B 320.

In block 322, the computational resources of computational unit B 320 may be utilized to employ the set of light path samples and/or the rendered image to calculate a loss function for the current NN weights. In block 324, the computational resources of computational unit B 320 may be utilized to update the weights of the NN based on the calculated loss function and/or the set of light path samples. For example, the weights of the NN may be updated to decrease the value of the loss function. The updated weights may be provided to computational unit A 310, to re-determine and/or update the values of the raytracing parameters. As noted above, the specific architecture illustrated in FIG. 3 is not intended to be limiting, and other architectures may be employed to parallelize and/or multithread the various embodiments discussed herein.

Generalized Processes for Generating and Recommending Embedded Images

Figure 4:
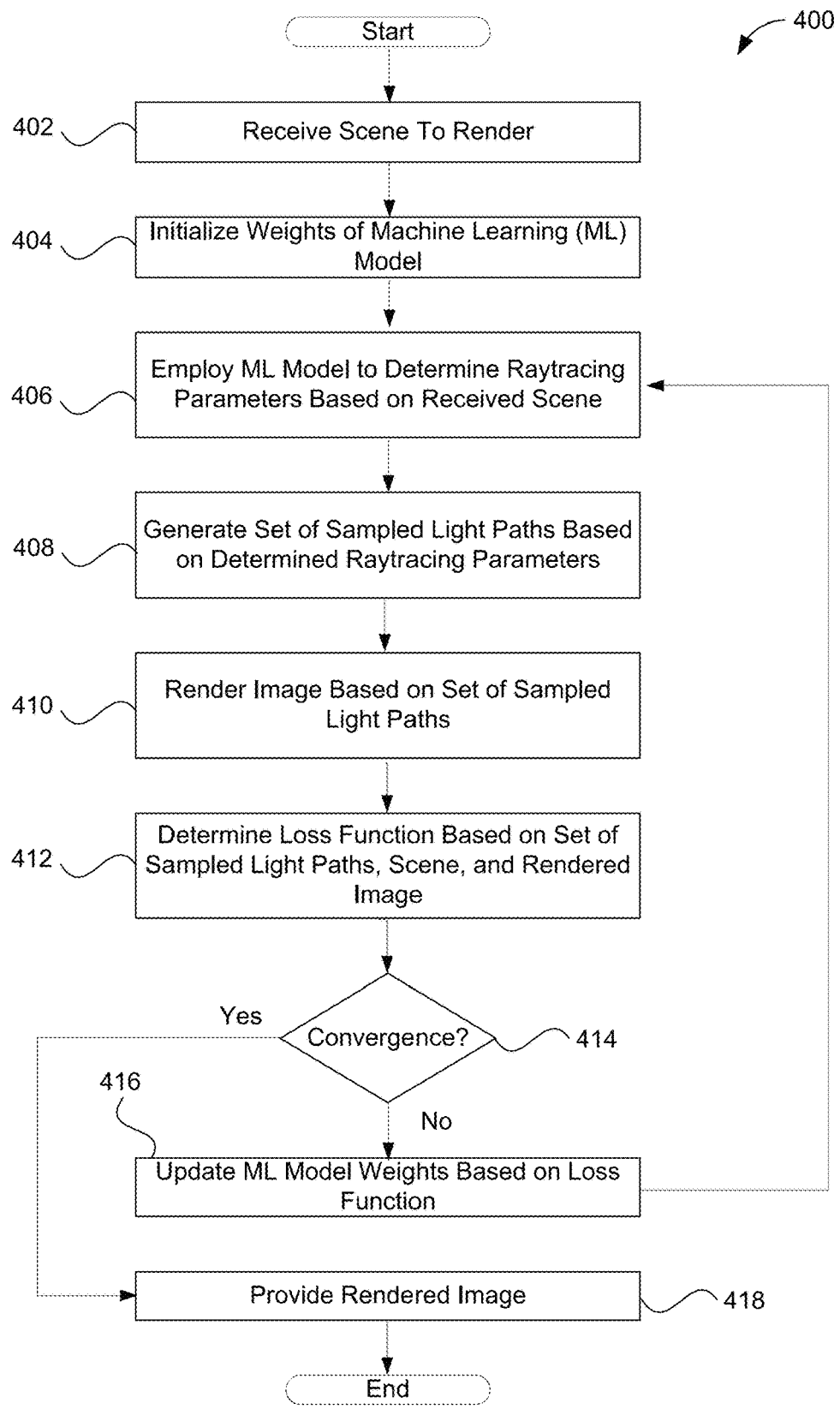
FIG. 4 illustrates one embodiment of an enhanced process for rendering an image from deeply learned raytracing parameters, which is consistent with the various embodiments presented herein.
Figure 5:
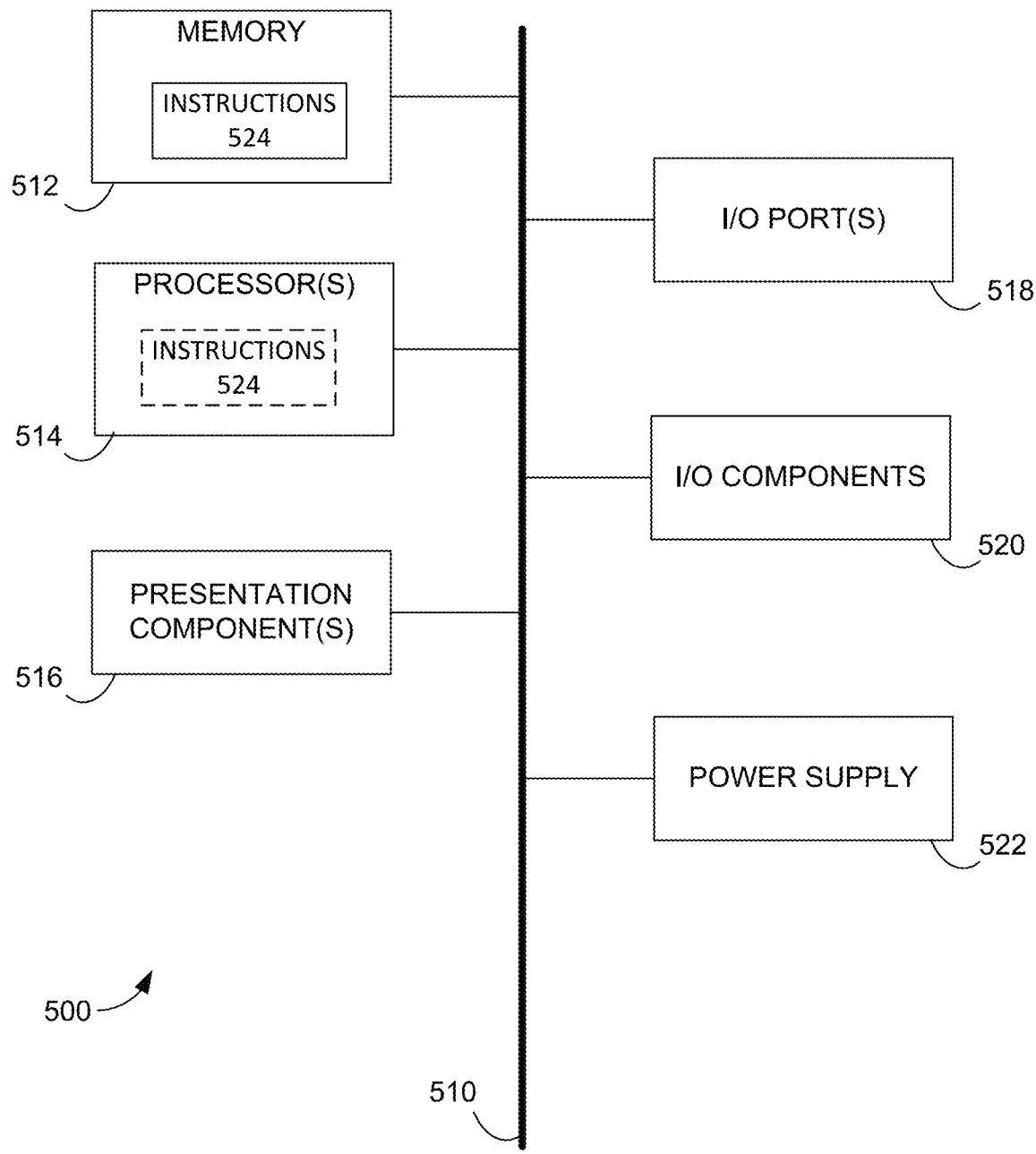
FIG. 5 is a block diagram of an example computing device in which embodiments of the present disclosure may be employed.

Processes 400 of FIG. 4, or portions thereof, may be performed and/or executed by any computing device, such as but not limited to computing devices 102-110 of FIG. 1, as well as computing device 500 of FIG. 5. Additionally, an image rendering engine, such as but not limited to image rendering engine 140 of FIG. 1, image rendering engine 200 of FIG. 2, and/or image rendering engine 300 of FIG. 3, may perform and/or execute at least portions of process 400. In at least one embodiment, a combination of computational units, such as but not limited to the combination of computational unit A 310 and computations unit B 320 of FIG. 3, may be employed to parallelize and/or multithread at least portions of process FIG. 4 illustrates one embodiment of an enhanced process for rendering an image from deeply learned raytracing parameters, which is consistent with the various embodiments presented herein. Process 400 begins, after a start block, at block 402, where a scene to render is received. In some embodiments, receiving a scene may include receiving at least one or more of a 3D environment, one or more objects to be positioned in the 3D environment, one or more light sources, and/or an image plane. At block 404, weights for machine learning (ML) model may be initialized. The ML model may be implemented via a neural network (NN), such as but not limited to NN 232 of FIG. 232. In some embodiments, the weights for the NN may be randomly initialized.

At block 406, the ML model is employed to determine one or more raytracing parameters based on the received scene. For example, the environment, with the objects positioned within the environment may be inputted into ML model to determine $\beta(x_i, x_i \to x_{i-1})$. In various embodiments, $\beta(x_i, x_i \to x_{i-1})$ is employed to determine $q_r(x_i)$. In at least one embodiments, a ML model may be employed to determine $q_d(x_i)$. In at least one embodiment, NN module 230 of FIG. 2 may be employed to utilize NN 232 to determine the raytracing parameters/At block 408, a set of sampled light paths is generated based on the determined raytracing parameters. For example, ray tracer 210 of FIG. 2 may be employed to generate the set of sampled light paths. Ray tracer 210 may utilize MC module 220 of FIG. 2 to generate the random or pseudo-random numbers required to generate the set of sampled light paths.

At block 410, an image of the scene is rendered based on the set of sampled light paths. For instance, image rendering module 250 of FIG. 2 may utilize the set of sampled light paths to render an image, such as but not limited to image 252. At block 412, a loss function (L) is determined and/or computed based on at least one of the set of sampled light paths, the rendered image, and/or the scene. In at least one embodiment, NN trainer 240 of FIG. 2 may determine the loss function. At decision block 414, one or more tests for convergence are performed. The convergence tests may be based on at least one of the loss function, the rendered image, and/or the loss function.

If the convergence test is passed, then process 400 flows to block 418, where the rendered image is provided to a user. Process 400 may then terminate. If the convergence test is not passed, process 400 flows to block 416 where the ML model weights are updated based on the loss function. In at least one embodiment, NN trainer 240 may update the weights of the NN based on decreasing the value of the loss function. That is, NN trainer 240 may train the NN via active learning. Process 400 may returns to block 406 to re-determine and/or update the one or more raytracing parameters.

Illustrative Computing Device

Having described embodiments of the present invention, an example operating environment in which embodiments of the present invention may be implemented is described below in order to provide a general context for various aspects of the present invention. Referring to FIG. 5, an illustrative operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 5 is merely illustrative of an example computing device that can be used in connection with one or more embodiments of the present disclosure. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. Memory 512 may be non-transitory memory. As depicted, memory 512 includes instructions 524. Instructions 524, when executed by processor(s) 514 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 500 includes one or more processors that read data from various entities such as memory 512 or I/O components 520. Presentation component(s) 516 present data indications to a user or other device. Illustrative presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects herein-above set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A non-transitory computer-readable storage medium having instructions stored thereon, which, when executed by a processor of a computing device cause the computing device to perform actions comprising:
    employing a machine learning (ML) model to determine a value for at least one raytracing parameter based on a scene;
    generating a set of light path samples based on the determined value for the at least one raytracing parameter and the scene;
    generating an image of the scene based on the generated set of light path samples;
    updating the ML model;
    updating the value for the at least one raytracing parameter based on the updated ML model; and
    updating the image of the scene based on the updated value for the at least one raytracing parameter.

2. The computer-readable storage medium of claim 1, the actions further comprising:
    evaluating a loss function based on the set of light path samples; and
    wherein updating the ML model comprises updating a plurality of weights of the ML model based on the evaluated loss function.

3. The computer-readable storage medium of claim 2, wherein the loss function includes a first factor that is based on a computational cost associated with generating the set of light path samples and a second factor that is based on a variance corresponding to direct and indirect lighting effects in the rendered image of the scene that are associated with the set of light path samples.

4. The computer-readable storage medium of claim 2, wherein updating the plurality of weights of the ML model is in response to a determination that the plurality of weights have yet to pass a convergence test.

5. The one or more computer-readable storage media of claim 1, wherein the ML model is implemented via a fully-connected feed-forward neural network.

6. The one or more computer-readable storage media of claim 1, wherein the value for the at least one raytracing parameter indicates a number of light path samples in the set of light path samples that are generated based on tracing next ray segments.

7. The one or more computer-readable storage media of claim 1, wherein the value for the at least one raytracing parameter indicates a number of light path samples in the set of light path samples that are sampled directly from a light source included in the scene.

8. The one or more computer-readable storage media of claim 1, wherein the value for the at least one raytracing parameter is a function of a vertex of one or more light path samples included in the set of light path samples.

9. The computer-readable storage medium of claim 1, the actions further comprising:
    determining one or more multiple importance sampling (MIS) weights based on the value for the at least one raytracing parameter; and
    generating the set of light path samples based on the determined one or more MIS weights.

10. The one or more computer-readable storage media of claim 1, wherein when the value for the at least one raytracing parameter is between 0.0 and 1.0, a pseudo-random number is employed to determine when to terminate a light path sample included in the set of light path samples.

11. A method comprising:
    employing a neural network (NN) to determine a value for at least one raytracing parameter based on a scene;
    generating a set of light path samples based on the determined value for the at least one raytracing parameter and the scene;
    generating the image of the scene based on the generated set of light path samples
    updating the NN;
    updating the value for the at least one raytracing parameter based on the updated NN; and
    updating the image of the scene based on the updated value for the at least one raytracing parameter.

12. The method for claim 11, further comprising:
    determining a loss function based on the set of light path samples; and wherein updating the NN comprises updating a plurality of weights of the NN based on the determined loss function.

13. The method of claim 11, wherein the method further comprises:
   receiving a selection of a three-dimensional (3D) environment;
   receiving a selection of one or more objects to be positioned within the 3D environment;
   receiving a selection of one or more light sources to illuminate the 3D environment and the one or more virtual objects positioned within the environment; and
   receiving a selection of an image plane within the 3D environment that corresponds to the image of the scene.

14. The method of claim 13, wherein at least one of the 3D environment, the one or more objects, or the one or more light sources is virtual.

15. A computing system for generating an image of a scene, comprising:
   a processor device; and
   a computer-readable storage medium, coupled with the processor device, having instructions stored thereon, which, when executed by the processor device, perform actions comprising:
   employing a machine learning (ML) model to determine a value for at least one raytracing parameter based on the scene;
   generating a set of light path samples based on the determined value for the at least one raytracing parameter and the scene;
   generating the image of the scene based on the generated set of light path samples;
   updating the ML model;
   updating the value for the at least one raytracing parameter based on the updated ML model; and
   updating the image of the scene based on the updated value for the at least one raytracing parameter.

16. The computing system of claim 15, the actions further comprising:
   determining a loss function based on the set of light path samples; and
   wherein updating the ML model comprises updating a plurality of weights of the ML model based on the set of light path samples and the determined loss function.

17. The computing system of claim 16, wherein the loss function includes a first factor that is based on a computational cost associated with generating the set of light path samples and a second factor that is based on a variance corresponding to direct and indirect lighting effects in the rendered image of the scene that are associated with the set of light path samples.

18. The computing system of claim 15, wherein the ML model is implemented via a neural network.

19. The computing system of claim 15, wherein generating a set of light path samples includes employing a Monte Carlo-based raytracing algorithm.

20. The computing system of claim 15, wherein the ML model is trained for the scene via active learning.

* * * * *